(12) United States Patent
Arthur

(10) Patent No.: US 8,650,086 B2
(45) Date of Patent: Feb. 11, 2014

(54) SYSTEM FOR ACTIVATION OF MULTIPLE CARDS

(71) Applicant: First Data Corporation, Greenwood Village, CO (US)

(72) Inventor: Steven E. Arthur, Parker, CO (US)

(73) Assignee: First Data Corporation, Greenwood Village, CO (US)

( * ) Notice: Subject to any disclaimer, the term of this patent is extended or adjusted under 35 U.S.C. 154(b) by 0 days.

(21) Appl. No.: 13/749,335

(22) Filed: Jan. 24, 2013

(65) Prior Publication Data

US 2013/0179280 A1 Jul. 11, 2013

Related U.S. Application Data

(63) Continuation of application No. 10/696,014, filed on Oct. 28, 2003, now Pat. No. 8,370,205.

(51) Int. Cl.
*G06Q 20/00* (2012.01)

(52) U.S. Cl.
USPC .............................................. 705/16; 705/17

(58) Field of Classification Search
None
See application file for complete search history.

(56) References Cited

U.S. PATENT DOCUMENTS

| | | | |
|---|---|---|---|
| 4,554,446 A | 11/1985 | Murphy et al. | |
| 5,200,889 A | 4/1993 | Mori | |
| 5,220,501 A | 6/1993 | Lawlor et al. | |
| 5,256,863 A | 10/1993 | Ferguson et al. | |
| 5,555,496 A | 9/1996 | Tackbary et al. | |
| 5,696,908 A | 12/1997 | Muehlberger et al. | |
| 5,699,528 A | 12/1997 | Hogan | |
| 5,757,917 A | 5/1998 | Rose et al. | |
| 5,774,879 A | 6/1998 | Custy et al. | |
| 5,777,305 A | 7/1998 | Smith et al. | |
| 5,826,241 A | 10/1998 | Stein et al. | |
| 5,832,458 A | 11/1998 | Jones | |
| 5,899,980 A | 5/1999 | Wilf et al. | |
| 5,905,246 A | 5/1999 | Fajkowski | |
| 5,923,016 A | 7/1999 | Fredegill et al. | |
| 5,960,412 A | 9/1999 | Tackbary et al. | |
| 5,987,140 A | 11/1999 | Rowney et al. | |
| 5,987,429 A | 11/1999 | Maritzen et al. | |
| 5,991,750 A | 11/1999 | Watson | |
| 5,999,625 A | 12/1999 | Bellare et al. | |

(Continued)

FOREIGN PATENT DOCUMENTS

| | | |
|---|---|---|
| EP | 0911772 A2 | 4/1999 |
| EP | 0949596 A2 | 10/1999 |

(Continued)

OTHER PUBLICATIONS

Author Unknown, "Debit-It! The Best Idea in Payment Systems since the Credit Card," AmeriNet, Inc., 2000, 8 pages. Accessed at: http://www.debit-it.com/products.htm.

(Continued)

*Primary Examiner* — Paul Danneman
(74) *Attorney, Agent, or Firm* — Kilpatrick Townsend & Stockton LLP

(57) ABSTRACT

According to one embodiment of the invention, a system is provided for activating a plurality of cards. A first card number and a total number of cards can be provided to an activation system to process the activation of the plurality of cards.

15 Claims, 9 Drawing Sheets

(56) References Cited

U.S. PATENT DOCUMENTS

| | | |
|---|---|---|
| 6,000,608 A | 12/1999 | Dorf |
| 6,012,045 A | 1/2000 | Barzilai et al. |
| 6,012,048 A | 1/2000 | Gustin et al. |
| 6,032,133 A | 2/2000 | Hilt et al. |
| 6,044,363 A | 3/2000 | Mori et al. |
| 6,058,379 A | 5/2000 | Odom et al. |
| 6,058,417 A | 5/2000 | Hess et al. |
| 6,070,798 A | 6/2000 | Nethery |
| 6,073,117 A | 6/2000 | Oyanagi et al. |
| 6,088,684 A | 7/2000 | Custy et al. |
| 6,098,053 A | 8/2000 | Slater |
| 6,119,106 A | 9/2000 | Mersky et al. |
| 6,122,625 A | 9/2000 | Rosen |
| 6,167,386 A | 12/2000 | Brown |
| 6,175,823 B1 | 1/2001 | Van Dusen |
| 6,226,623 B1 | 5/2001 | Schein et al. |
| 6,246,996 B1 | 6/2001 | Stein et al. |
| 6,308,887 B1 | 10/2001 | Korman et al. |
| 6,336,099 B1 | 1/2002 | Barnett et al. |
| 6,473,500 B1 | 10/2002 | Risafi et al. |
| 6,612,487 B2 * | 9/2003 | Tidball et al. ............... 235/380 |
| 6,847,935 B1 | 1/2005 | Solomon et al. |
| 6,957,737 B1 * | 10/2005 | Frederickson et al. ....... 206/449 |
| 7,006,983 B1 | 2/2006 | Packes et al. |
| 7,028,896 B2 | 4/2006 | Goldstein et al. |
| 7,578,439 B2 | 8/2009 | Graves et al. |
| 7,614,548 B2 | 11/2009 | Schultz et al. |
| 7,841,520 B2 | 11/2010 | Schultz et al. |
| 8,256,682 B2 | 9/2012 | Chakiris et al. |
| 2001/0018660 A1 | 8/2001 | Sehr |
| 2001/0047342 A1 | 11/2001 | Cuervo |
| 2002/0049669 A1 | 4/2002 | Bleser et al. |
| 2002/0152116 A1 | 10/2002 | Yan et al. |
| 2002/0161641 A1 | 10/2002 | Quinlan et al. |
| 2002/0165795 A1 | 11/2002 | Holley et al. |
| 2003/0001005 A1 | 1/2003 | Risafi et al. |
| 2003/0024981 A1 | 2/2003 | Narasimhan |
| 2003/0053609 A1 | 3/2003 | Risafi et al. |
| 2003/0097331 A1 | 5/2003 | Cohen |
| 2003/0115126 A1 | 6/2003 | Pitroda |
| 2003/0150142 A1 | 8/2003 | Street |
| 2003/0154163 A1 | 8/2003 | Phillips |
| 2005/0033639 A1 | 2/2005 | Myers |
| 2005/0091115 A1 | 4/2005 | Arthur |
| 2006/0261154 A1 | 11/2006 | Arthur et al. |

FOREIGN PATENT DOCUMENTS

| | | | |
|---|---|---|---|
| EP | 1077436 | A2 | 2/2001 |
| WO | 00/22559 | A1 | 4/2000 |
| WO | 00/34899 | A1 | 6/2000 |
| WO | 00/54122 | A2 | 9/2000 |
| WO | 00/67177 | A2 | 11/2000 |
| WO | 00/79452 | A2 | 12/2000 |
| WO | 01/04816 | A1 | 1/2001 |
| WO | 01/41419 | A1 | 6/2001 |

OTHER PUBLICATIONS

Author Unknown, "DotBank You've Got Money," Arthas Corp., 1999, 7 pages. Accessed at: http://dotbank.com.

Author Unknown, "How PayPal.com Works," Confinity, Inc., 2000, 7 pages. Accessed at: http://www.paypal.com/cgi-bin . . . .

Author Unknown, "Intell-A-Check," Intell-A-Check, Corp., 2000, 7 pages. Accessed at: http://icheck.com . . . .

Author Unknown, "PayMe.com Getting money from friends and clients has never been easier!" Idealab, 2000, 7 pages. Accessed at: https://ssl.idealab.com . . . .

Author Unknown, "TeleCheck: Making Checks Our Responsibility," TeleCheck International, Inc., 1999, 8 pages. Accessed at: http://www.telecheck.com . . . .

Author Unknown, "TeleCheck: Verification Services," TeleCheck International, Inc., 1999, 7 pages. Accessed at: http://www.telecheck.com . . . .

Author Unknown, "Transpoint Common Questions," TransPoint, 2000, 12 pages. Accessed at: http://www.transpoint.com/service . . . .

Woo, S., et al., "Rebate quest often result in unhappy returns," The Denver Post, Apr. 1, 2001, 2 pages.

International Search Report and Written Opinion of PCT/US2008/072638 mailed Jan. 27, 2009, 8 pages.

U.S. Appl. No. 10/167,720, Office Action dated Apr. 6, 2009, 14 pages.

U.S. Appl. No. 10/167,720, Advisory Action dated Dec. 23, 2008, 2 pages.

U.S. Appl. No. 10/167,720, Final Office Action dated Oct. 31, 2008, 12 pages.

U.S. Appl. No. 10/238,044, Office Action dated Jan. 16, 2009, 14 pages.

U.S. Appl. No. 10/238,044, Advisory Action dated Oct. 20, 2008, 3 pages.

U.S. Appl. No. 10/356,368, Office Action dated Oct. 25, 2007, 11 pages.

U.S. Appl. No. 10/356,368, Final Office Action dated Mar. 13, 2008, 12 pages.

U.S. Appl. No. 10/356,368, Advisory Action dated May 21, 2008, 3 pages.

U.S. Appl. No. 10/356,368, Final Office Action dated Jul. 18, 2008, 16 pages.

U.S. Appl. No. 11/419,431, Office Action dated Apr. 7, 2009, 14 pages.

U.S. Appl. No. 11/419,413, Final Office Action dated Dec. 23, 3008, 16 pages.

U.S. Appl. No. 11/837,252, filed Aug. 10, 2007.

U.S. Appl. No. 11/837,252, Office Action dated Dec. 16, 2008, 20 pages.

* cited by examiner

SYSTEM FOR ACTIVATION OF MULTIPLE CARDS

CROSS-REFERENCES TO RELATED APPLICATIONS

This application is a continuation of U.S. patent application Ser. No. 10/696,014, filed Oct. 28, 2003, the complete disclosure of which is herein incorporated by reference.

The embodiments of this invention relate generally to cards for purchasing items, such as at point-of-sale devices. In particular, some embodiments of the invention relate to gift cards.

BACKGROUND

One convenience item that is commonly purchased at point-of-sale devices is the gift card. Gift cards are often displayed at point-of-sale devices such as at supermarket checkout stands or restaurant cashier stands. In the typical setting, a consumer will purchase one or two gift cards at a time. These gift cards are often activated by swiping them at the checkout stand at which point the card number is referred to a computer which activates the card's account.

However, there are some purchasers who desire to purchase a large quantity of gift cards at a single time. For example, a corporate entity may desire to purchase a large number of cards as rewards for its employees. Similarly, a consumer may desire to purchase a large number of gift cards and sell them at a discount to others. Thus, there is a portion of the consuming public that actually purchases a large number of cards at a single checkout.

As a result of this, it can severely delay the checkout process if the cashier is required to swipe all of the cards being purchased. For example, a cashier may have to swipe 100 individual cards which are then activated and confirmed. The resulting delay can severely hamper the progression of consumers through the checkout lines at a store.

Similarly, there is a need for a packaging system that allows a purchaser to conveniently purchase a bulk amount of cards without the necessity of physically counting the individual cards. Again, since these cards are often purchased at the checkout lane, a delay can be incurred if the consumer is required to count out the number of cards that he or she desires to purchase.

As a result, there is a need for a more efficient mechanism for purchasing a large amount of cards. Furthermore, a packaging system that solves the problem of the current implementation of selling cards is desirable.

SUMMARY

According to one embodiment of the invention, a method of activating a plurality of gift cards at a point-of-sale device is provided by providing a first card number corresponding to a first card in the series of cards; providing a total number of cards to be activated; activating the card corresponding to the first card number; and activating the next successive card in the series corresponding to the next successive card number.

According to another embodiment of the invention, the method of activating more than one gift card at a point-of-sale device is provided by receiving a plurality of cards at a point-of-sale device; entering a first indicator indicative of a first card in the plurality of cards; entering a total number of cards in the plurality of cards; indicating the first indicator and the total number of cards to an activation computer; receiving confirmation that the plurality of cards have been approved for activation.

According to yet another embodiment of the invention, a method of validating the activation of a plurality of cards is provided by receiving from a point-of-sale device an indicator indicative of a first card in the plurality of cards; receiving an indicator indicative of a total number of cards in the plurality of cards; determining whether the plurality of cards can be activated; and indicating a validation signal so as to indicate at the point-of-sale device whether the plurality of cards can be activated.

According to one embodiment of the invention, a packaging system is provided by providing a plurality of cards having sequential card numbers; packaging the plurality of cards in the common package; configuring at least one card number for detection by a bar code scanner; and labeling the package with the total number of cards in the package.

Similarly, another method of packaging cards according to one embodiment of the invention is provided by supplying as a package a plurality of cards, each of the cards having a different respective card number; wherein the card numbers form a sequential order; and providing a package identifier on the package wherein the package identifier comprises an indicator indicating one of the plurality of cards and an indicator indicating the total number of cards in the package for activation.

Further embodiments of the invention will be apparent to those of ordinary skill in the art from a consideration of the following description taken in conjunction with the accompanying drawings, wherein certain methods, apparatuses, and articles of manufacture for practicing the embodiments of the invention are illustrated.

DETAILED DESCRIPTION

Figure 7:
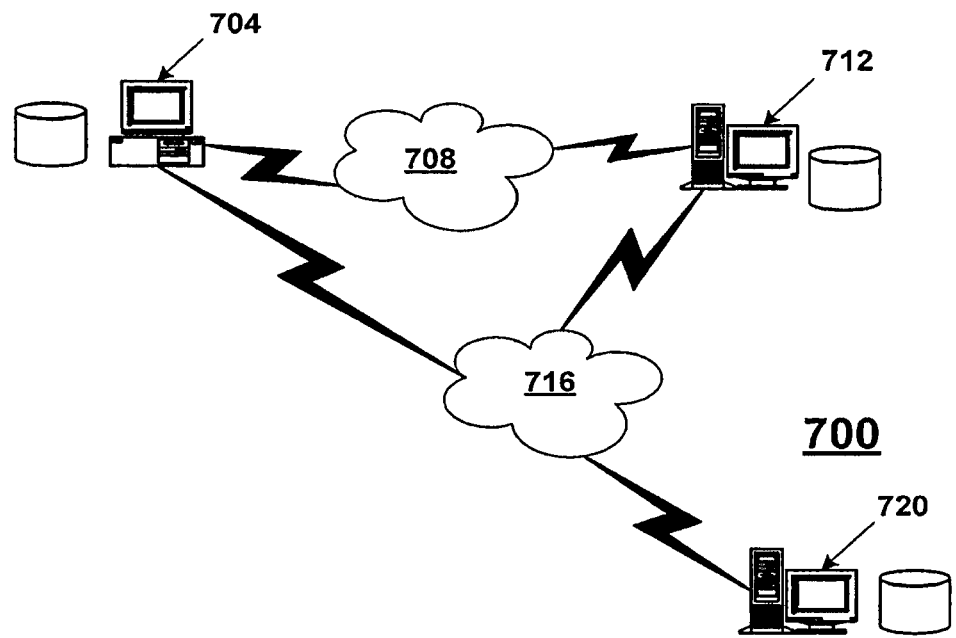
FIG. 7 illustrates a system for activating a plurality of cards according to one embodiment of the invention.

Referring now to FIG. 7, a system for implementing an embodiment of the invention can be seen. FIG. 7 illustrates a system 700 which is comprised of a point-of-sale device 704, a validation computer system 712, and an activation computer database 720. The various systems are coupled by networks 708 and 716 in FIG. 7. However, it should be noted that a variety of coupling systems could be used to interlink the various computer systems for purposes of this embodiment of the invention.

In FIG. 7, point-of-sale device 704 is coupled with a card validation computer 712 across network 708. The card validation computer system 712 is similarly coupled via network 716 with card activation computer system 720. Upon a consumer presenting a large amount of gift cards, for example, at the point-of-sale device 704, a clerk can scan the first card so that a bar code on the card is detected by a bar code reader or alternatively swipe the first card through a magnetic stripe reader if magnetic stripe encoding is used. The card number indicated by the bar code or magnetic stripe is subsequently transmitted across network 708 to the card validation computer 712. Furthermore, the clerk can enter the total number of cards to be purchased at the point-of-sale device. Then this number can be transmitted across network 708, as well, to the card validation system. The card validation system can then determine whether the card which has been presented will likely be capable of being activated.

The card validation computer system 712 performs the function of determining whether the card which has been presented will be activated. Not all cards that are presented will necessarily be capable of being activated. Cards of different type may inadvertently be presented to the cashier for activation where the consumer mistakenly believes they are all of the same type. The validation system is capable of determining whether the cards that have been presented are all of the same type and amount. Similarly, some cards may have already been activated by prior aborted purchases or other means. Therefore, the card validation computer is capable of detecting whether an error would occur for an already activated card. Thus, the card validation computer system 712 operates as a first check to determine whether the cards can all be activated. The actual activation process is a more time-intensive process. Since a significant number of cards can be involved, it is preferred to validate the activation of the cards rather than waiting for all the cards to be activated before signaling back to the point-of-sale device. Nevertheless, in some instances, it may be useful to eliminate the validation act and perform an actual activation before responding to the point of sale (POS).

The card activation computer system 720 provides the actual activation of a card number. Such a card number may appear on a plastic card. Thus, the activation process refers to activating an account referred to by the card number as opposed to activating an actual card itself, e.g., a smart card. Any type of card can be used to provide the card number at the point-of-sale device, e.g., plastic card with bar code, magnetic stripe card, card with numbers written on the card, smartcard, etc. It merely represents the account from which purchase amounts are decremented.

While the validation computer 712 and activation computer system 720 have been described as different computers, alternatively they could be performed by the same computer system. Similarly, network 708 and 716 could be the same network.

Figure 2:
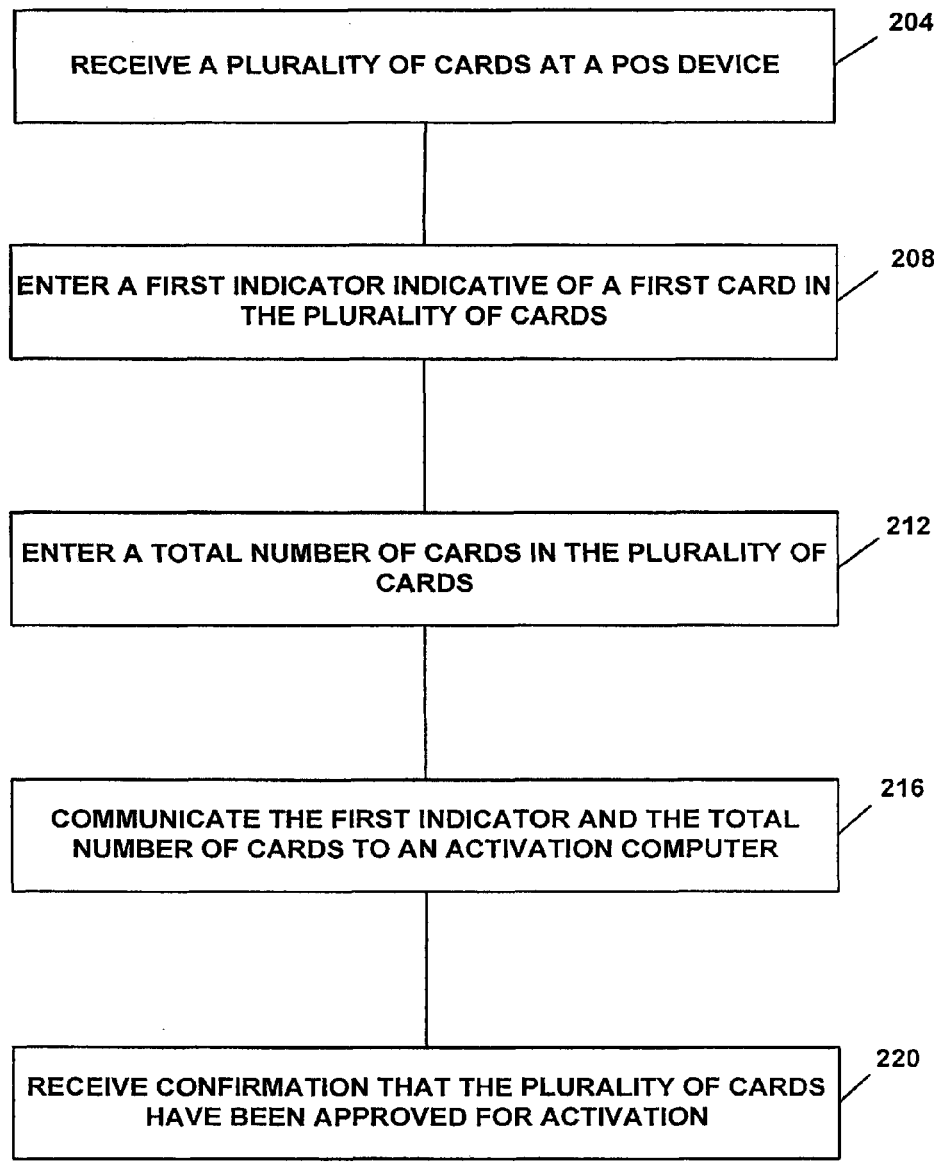
FIG. 2 illustrates a flowchart demonstrating a method for approving activation of a plurality of cards according to one embodiment of the invention.

Referring now to FIG. 2, a method according to one embodiment of the invention will be described. FIG. 2 illustrates a flowchart 200 demonstrating a method for implementing a purchase of a large number of cards, for example, gift cards at a point-of-sale device. In method 200, a consumer presents a plurality of cards at a point-of-sale device. The plurality of cards are received by the clerk in block 204. The clerk can then enter the indicator for the first card which is one of the cards in the pack of cards presented by the consumer. Thus, a first indicator indicative of a first card in the plurality of cards is entered in block 208. The clerk can enter the first card number by swiping the card through the magnetic stripe reader, keying in the card number into the point-of-sale device, scanning a bar code from the card, or other similar means. In block 212, the total number of cards is entered. Again, the clerk can hand key in the total number of cards that are presented. Alternatively, the point-of-sale device can request a confirmation of the last number in the pack of cards. Thus the clerk can either swipe or hand key in the number of the last card that makes up the pack of cards. In this way, a check can be performed that the entered total number of cards is actually correct. This can be accomplished by simple calculation using the first card number and the last card number.

In block 216, the first indicator, which has the card number of the first card, and the total number of cards in the pack of cards are communicated to an activation computer. This can be a direct communication or performed through the validation system, depending on the configuration of the system. In block 220, a confirmation is transmitted confirming whether the plurality of cards have been approved for activation.

Once a consumer presents a group of cards, there may be a change of heart in the purchase decision. At that point, the user can indicate the decision not to purchase the cards to the clerk and the clerk can void the transaction. When a void signal is transmitted, the activation process can either be aborted or, for a completed activation process, voided. A batch number can be used with the information sent from the point-of-sale device to initiate the activation of the cards. Thus, this same batch number can be used by the point-of-sale device to indicate the void of the purchase without having to enter every card number. The batch number serves as a reference number that voids the activation of the associated cards. Consequently, the computer system such as the computer system shown in FIG. 7 can utilize the batch number to initiate and void the activation of the cards by associating the batch number with the data and acts performed in the validation and activation processes. Alternatively, the batch number can originate at the host where it is assigned to a particular purchase of multiple cards. Still, it could be used as described above to void a purchase or to track a set of cards.

Figure 3:
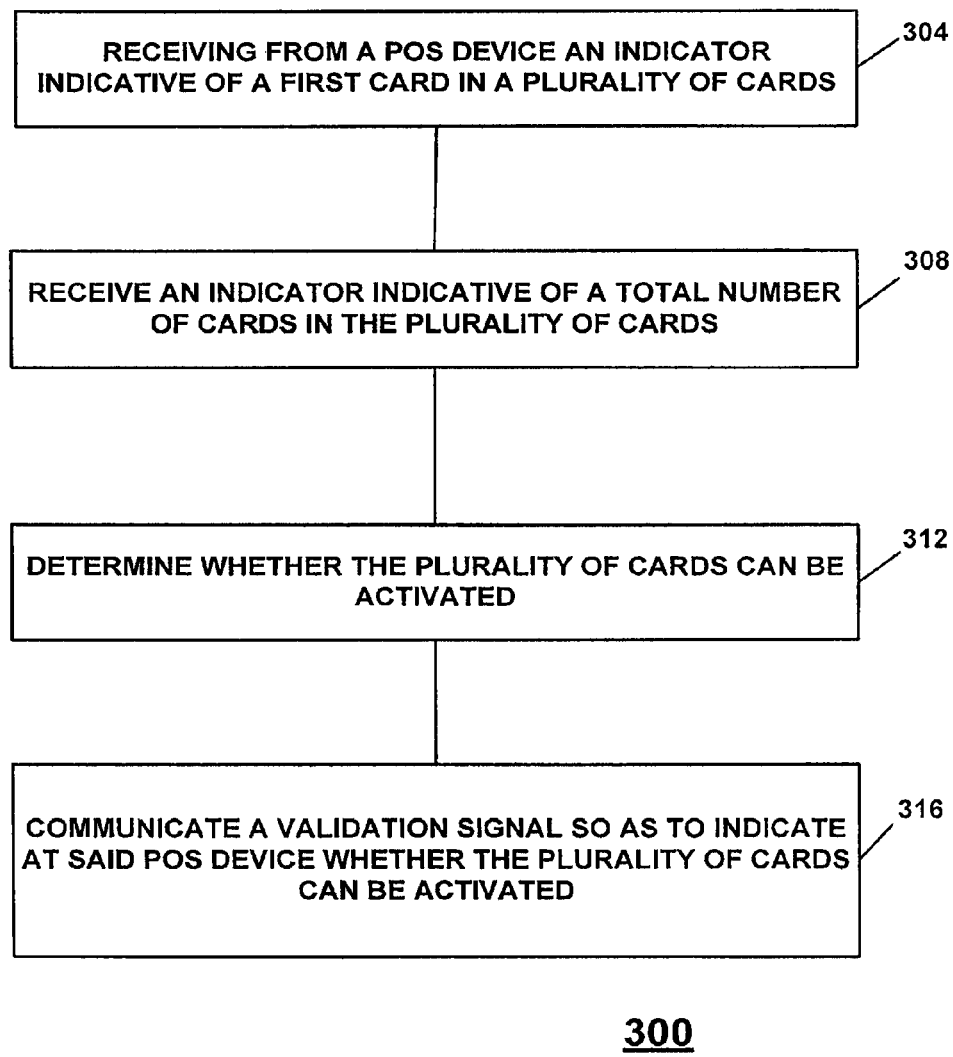
FIG. 3 illustrates a flowchart demonstrating a method of validating activation of a plurality of cards according to one embodiment of the invention.

FIG. 3 illustrates an example of the validation process. Namely, flowchart 300 illustrates a method according to one embodiment for validating whether a plurality of cards can be activated. In block 304, a signal is received at the validation computer from a point-of-sale device comprising an indicator which is indicative of a first card in the pack of multiple cards. In block 308, a second indicator is received which is indicative of the total number of cards in the pack of cards. This second indicator can be coupled with the indicator for the first card so that a single signal is sent to the validation computer. In block 312, a determination is made as to whether the pack (or group) of cards can be activated. Furthermore, in block 316, the result of the validation determination can be communicated by a validation signal so as to indicate at the point-of-sale device whether the plurality of cards in the pack of cards can be activated.

To determine whether the plurality of cards can be activated, a check can be made of the card numbers to confirm that all card numbers are of the same card type and card amount, for example. Thus, if a user presents a group of cards that are for different stores, such as Walmart and Starbucks, the validation procedure can note that the cards are of different types and abort the activation. Similarly, if the first card is for $50 and some of the remaining cards are for $100, the validation process can determine that there is an error and abort the activation of all the cards. Similarly, if a card has previously been activated, the validation process can note that fact and choose whether to activate the remaining cards. One possibility is to abort the entire activation process. However, another possibility is to skip that card and continue activating the remaining cards.

Figure 1:
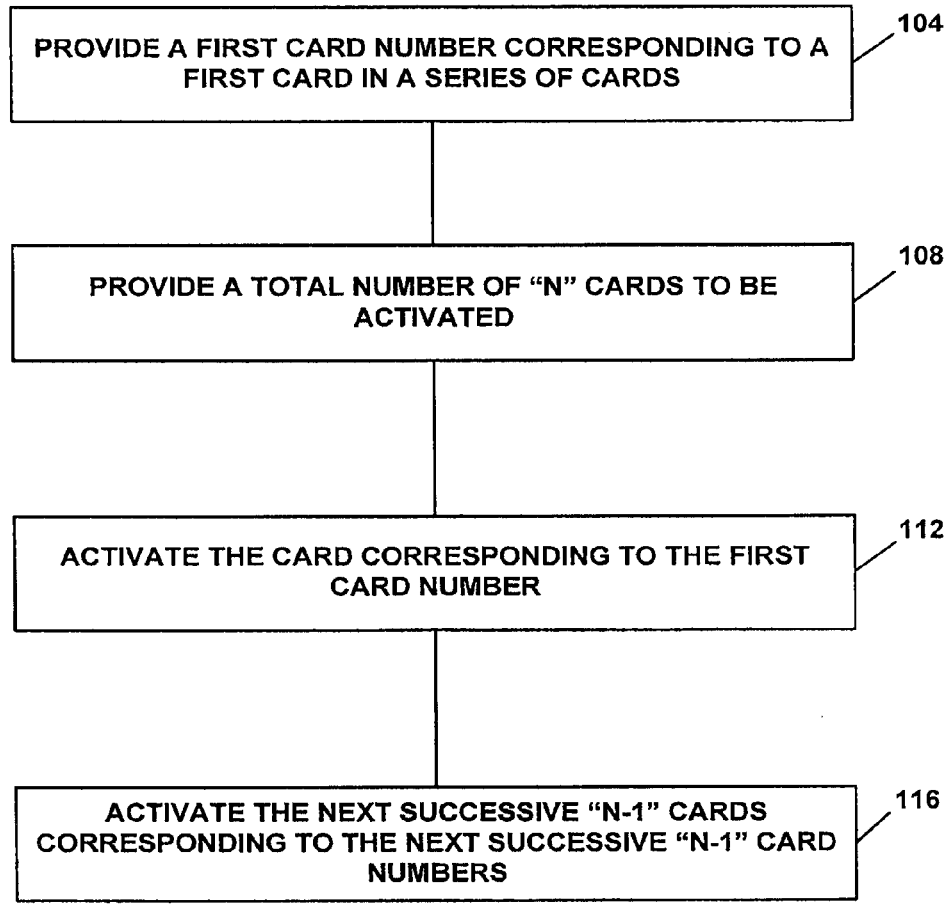
FIG. 1 illustrates a flowchart for implementing a method for activating a plurality of cards according to one embodiment of the invention.

FIG. 1 illustrates a flowchart 100 for implementing a method of activating a pack of cards, according to one embodiment of the invention. In block 104, a first card number corresponding to the first card in the series of cards is provided. Similarly, in block 108, the total number of cards to be activated is provided and illustrated by "N". In block 112, the first card number corresponding to the first card is activated by the activation system. Furthermore, in block 116, the next successive "N−1" cards corresponding to the next successive "N−1" card numbers are activated.

Again, it should be understood that card activation refers to activating the ability of the card to be used in a purchase. It does not require that the card be a device that can be activated, such as a smart card. For example, the card could merely be a plastic card with a number written on the card, a magnetic stripe card, or a card encoded with a bar code. The corresponding account would then be activated to allow purchases to be attributed to the account when the card is presented at the time of purchase. Furthermore, a card number is intended to mean the indicator associated with a particular card. Obviously, such an indicator could be comprised of letters or other indications. Preferably, the card number is a numerical indicator or alphabetical indicator so that successive cards can be easily identified. Of course, a card number might be indicated by bar code, magnetic stripe or the like for easy detection by automated card reading devices.

Figure 4A:
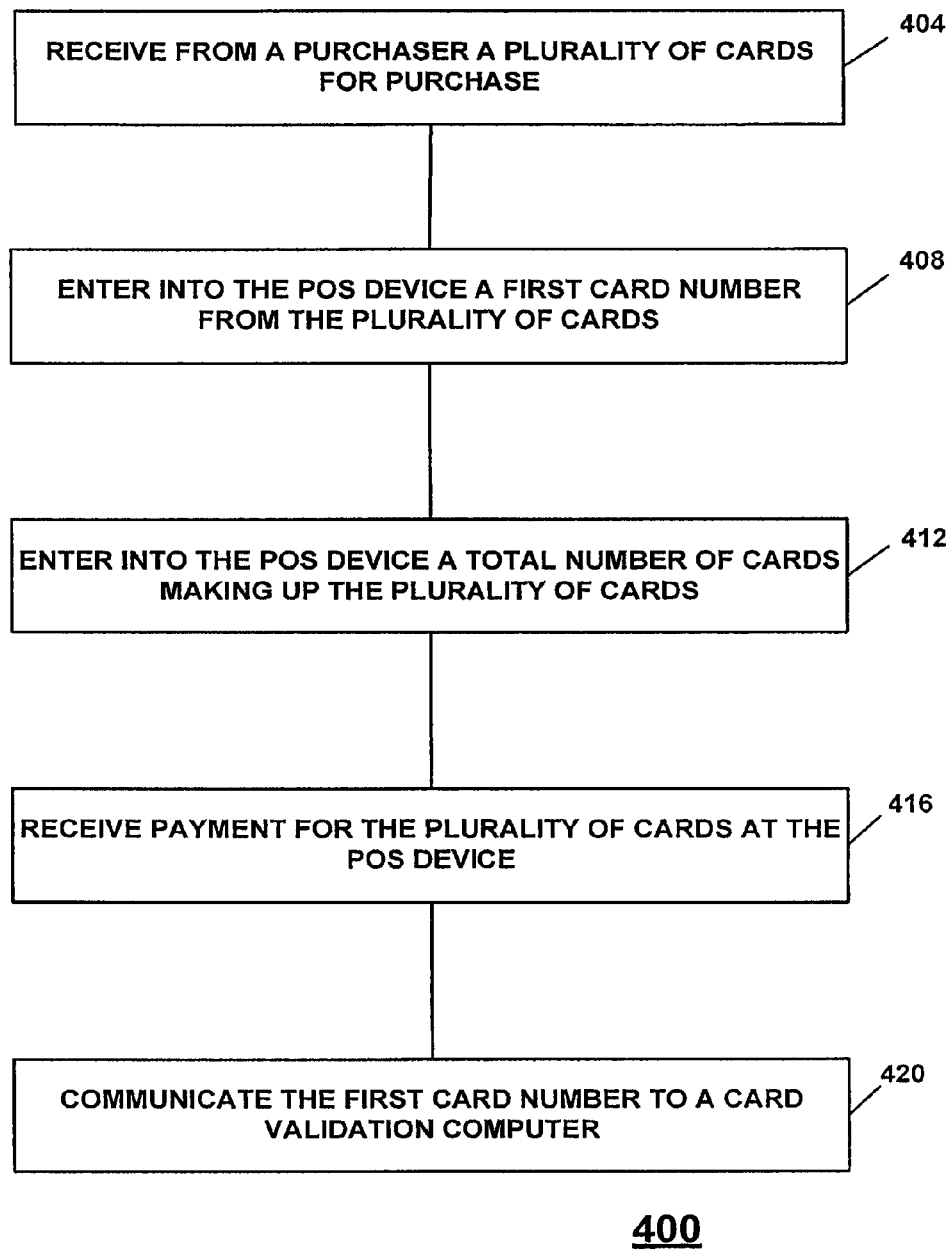
FIGS. 4A, 4B, and 4C illustrate a flowchart 400 for implementing a method for activating a plurality of cards according to one embodiment of the invention.
Figure 4B:
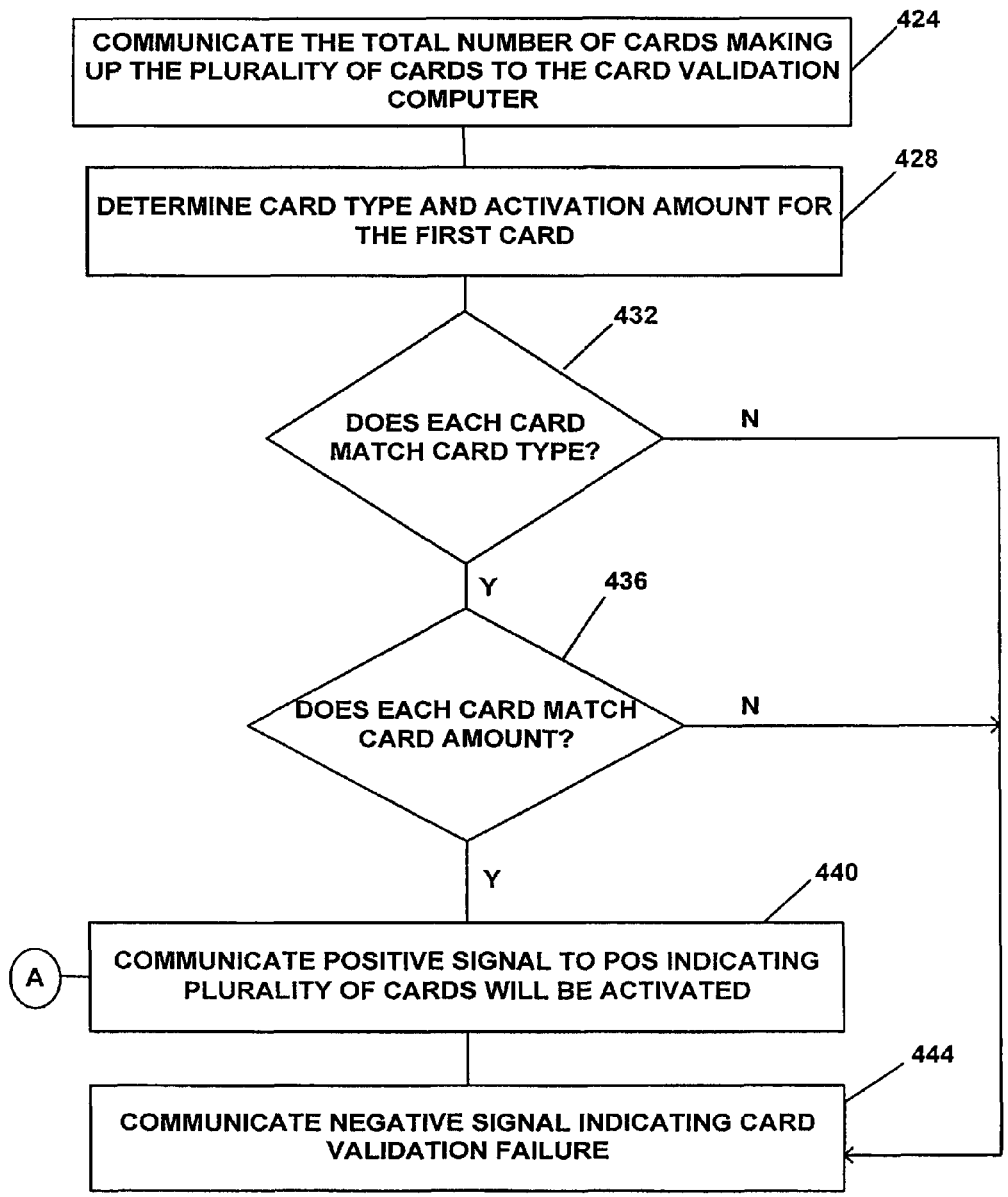
Figure 4C:
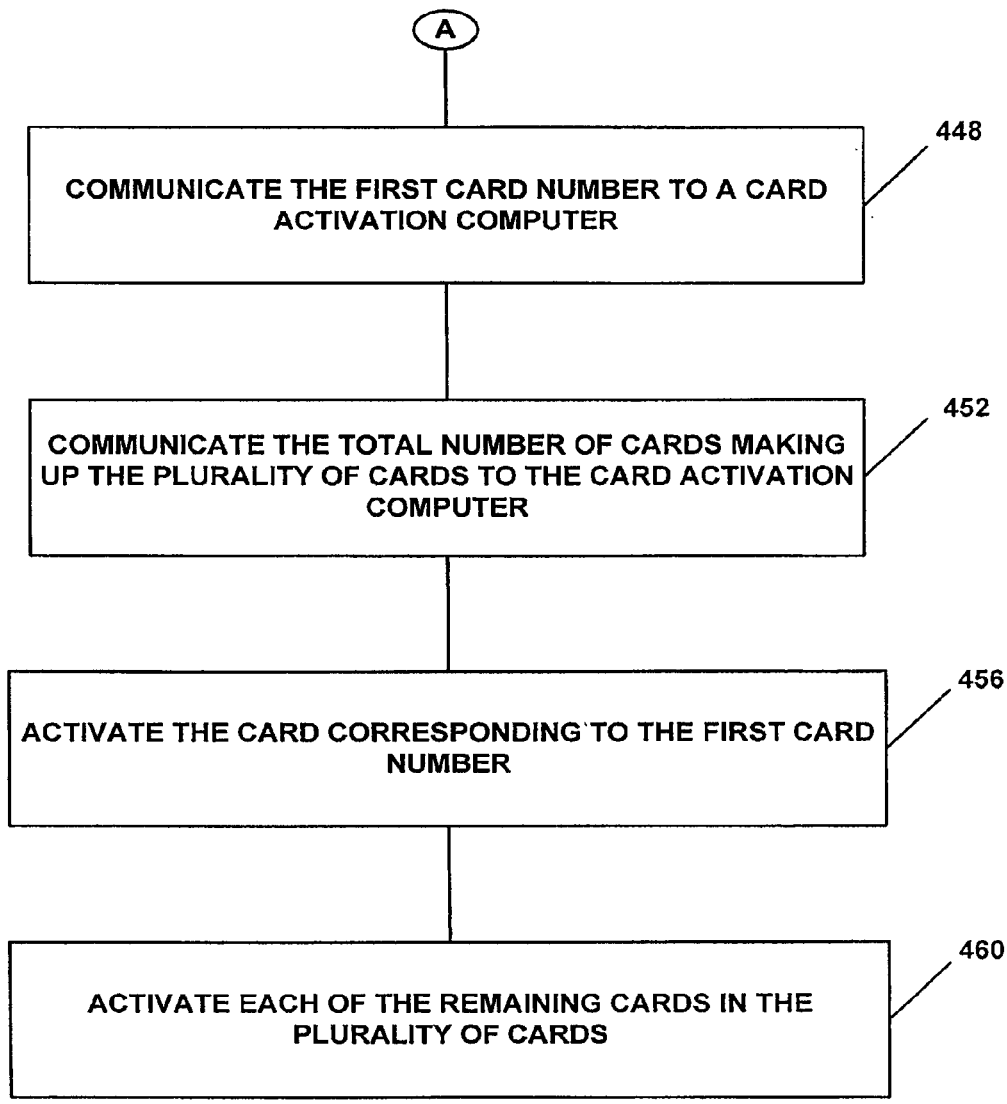

Referring now to FIGS. 4A, 4B, and 4C, a flowchart 400 illustrating a method according to one embodiment of the invention for activating a plurality of cards can be seen. Again, in block 404, a clerk receives from a purchaser a plurality of cards for purchase at a point-of-sale device. The clerk enters into the point-of-sale device the first card number from the plurality of cards as shown in block 408. The clerk can enter the first card number by swiping a first card across a magnetic stripe reader, scanning a bar code on the card, hand keying in the first card number, or using another automated means of entering this number. Furthermore, the clerk can enter into the point-of-sale device a total number of cards that make up the pack for the plurality of cards as shown in block 412. After completing the data entry of the pack of cards and any accompanying items, the clerk can request payment and process payment, as shown in block 416. In FIG. 4A, the point-of-sale device communicates the first card number to a card validation computer. Furthermore, in this example the point-of-sale device indicates the total number of cards making up the pack of cards to the card validation computer as shown in block 424. The validation computer, according to this example, determines the card type and activation amount for the first card as shown in block 428. In decision block 432, the remaining cards in the pack of cards are tested against the card type. For each card, a determination is made as to whether the card type of that card matches the card type of the first card. Thus, for example, a determination can be made as to whether all the cards are for Walmart gift cards. If the card types do not match, the validation computer communicates a negative signal to the point-of-sale device indicating card validation failure which represents the fact that not all the cards can be activated. If such a signal is sent to the point-of-sale device, the clerk can refund the money of the purchaser or retry with a different pack of cards. Similarly, in decision block 436, a second test can be performed to test whether each card matches the card amount of the first card. Again, some cards may be for $50 whereas other cards may be for $100. Therefore, this test confirms that all cards are for the same amount and the purchaser similarly paid the correct amount. Again, if the determination is negative, then a negative signal indicating card validation failure can be sent to the point-of-sale device as mentioned earlier . However, if all cards do satisfy the test criteria, then in block 440, a positive signal can be communicated to the point-of-sale device indicating that the pack of cards will be activated by the activation process. In block 448, the validation computer, according to this example, communicates the first card number to the card activation computer. Similarly, in block 452, the validation computer communicates the total number of cards making up the plurality of cards to the card activation computer. In block 456, the activation system initiates a batch process for activating each individual card by activating the card corresponding to the first card number. Then, in block 460, each of the remaining cards in the plurality of cards is individually activated. Thus, by a single message sent by the point-of-sale device, individual activation of the plurality of cards can take place as opposed to the point-of-sale device sending a plurality of activation requests to the activation system. Therefore, this process facilitates the speed with which a consumer can purchase cards and furthermore decreases the number of signals transmitted to the activation computer system. Thus, the activation computer system can make use of a batch process to implement the activation of a plurality of cards. Furthermore, by validating that the cards can be activated, the cards can be purchased before the activation process is completed. To the purchaser, however, it appears that the activation occurs in real time—even though the cards have only been validated as activatable. It is noted that the activation process need not start with the first card number, but flowchart 400 uses that as a logical example for demonstrating the activation process.

The signal sent from the point-of-sale device to the card validation system can be comprised of the first card number, the total number of cards, or alternatively, the last card number in the pack of cards. Furthermore, a batch number can be generated at the POS device and included as part of the activation request.

Alternatively, a batch number could be created at the validation computer or even the activation computer. Once assigned to a group of cards, the batch number can then be used to void the activation request at a later time in the procedure. Similarly, the batch number can be used for recordkeeping at the validation computer system and the activation computer system for tracking event records at each of those systems. In addition, the batch number can be reported back to the POS device so that the POS device can initiate a void procedure if the consumer decides not to purchase the cards.

The traditional way of selling gift cards in the past has been to present them at checkout stands hanging individually on display hangers. However, with the commercial success of such cards, consumers are now more inclined to purchase the items in bulk. For example, companies now recognize the value of rewarding employees, and gift cards are an easy way to reward a significant number of employees while allowing each employee to choose how to spend the monetary reward to that person's preferred taste. Thus, there is now a need to package the cards in such a way that they can easily be purchased in bulk without the risk of false activation of individual cards.

Figure 5:
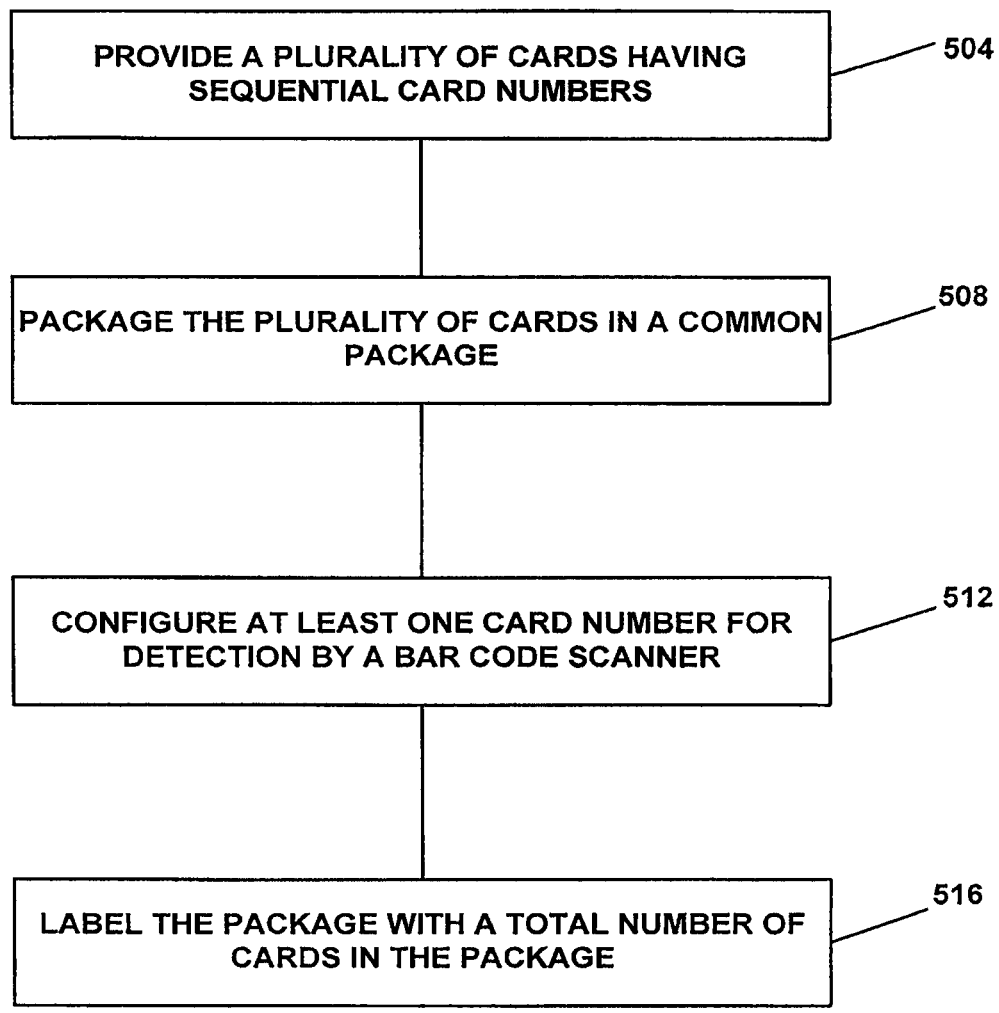
FIG. 5 illustrates a flowchart demonstrating a method for packaging a plurality of cards for activation according to one embodiment of the invention.

One method of doing this is to shrink wrap the cards such that a large sequential number of cards can be packaged together for easy purchase. However, to do so causes the individual card numbers to be obscured such that individual card numbers cannot be seen by the clerk or by a bar code scanner. Thus, one method of overcoming this obstacle is shown in FIG. 5. Namely, FIG. 5 illustrates a flowchart 500 for implementing a method of labeling packages for easy entry by a clerk at a point-of-sale device. In block 504, a plurality of cards are provided having sequential card numbers. In block 508, the plurality of cards are packaged into a common package, such as a shrink wrapped package. In block 512, the cards are configured within the package so that at least one card number can be detected such as by a bar code scanner or viewed by a clerk to hand key in the first card number. Furthermore, the package is also labeled with a total number of cards within the package as shown by block 516. Thus, when the package is presented at the checkout stand, the clerk can scan in the first number and hand key in the total number of cards. Alternatively, the package could be labeled with a bar code indicating the total number of cards that is also scanned in.

Figure 6:
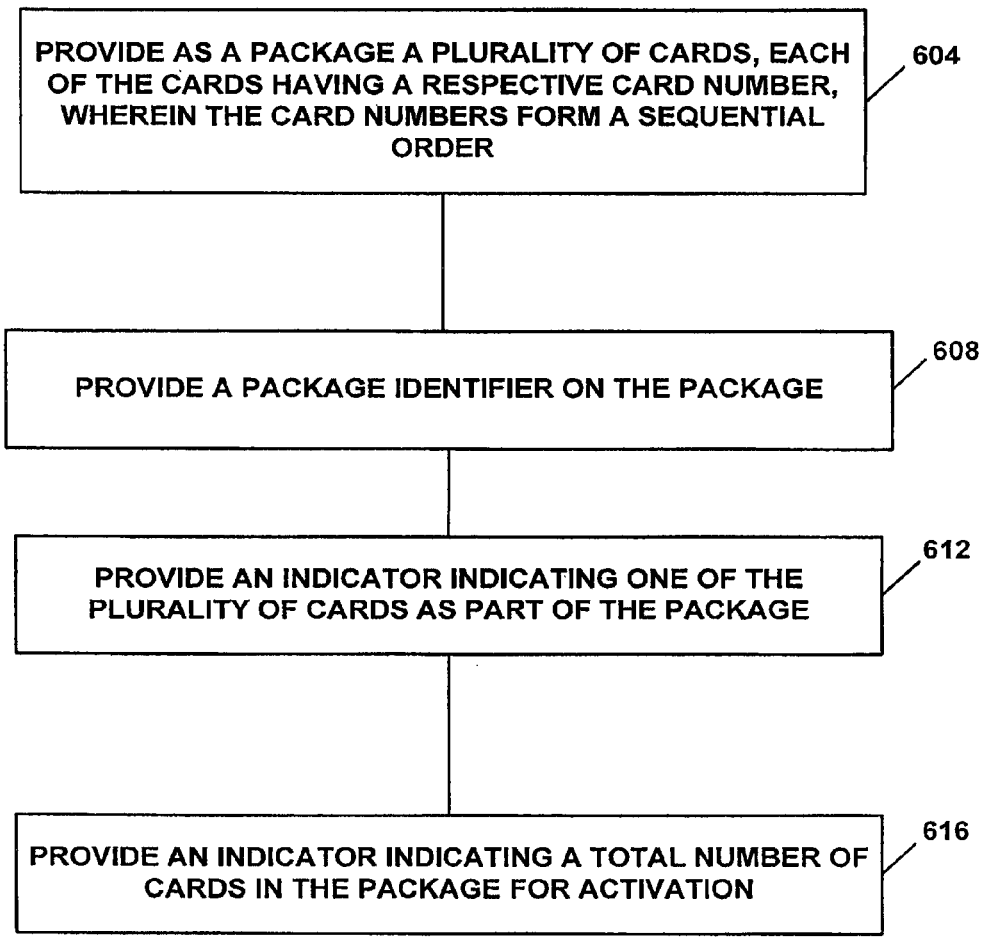
FIG. 6 illustrates a flowchart demonstrating a method for labeling a package of cards according to one embodiment of the invention.

Yet another embodiment of packaging the plurality of cards is shown in FIG. 6 by flowchart 600. In block 604, a plurality of cards are provided as a package. Each card has a respective card number and the card numbers form a sequential order. In block 608, a package identifier is provided on the package. In block 612, an indicator indicating one of the numbers of the plurality of cards is provided as part of the package. Furthermore, in block 616, an indicator indicating a total number of cards is provided as part of the package. Thus, in this alternative embodiment, a shrink wrapped group of cards can be labeled with a single label, for example, which is comprised of a card number and the total number of cards. Thus, when the bar code reader at the point-of-sale device scans the package, it knows not only the card number, but also the total number of cards to be activated. As a result, the algorithm at the validation computer can perform the validation process on the cards indicated by that set of numbers. Normally, this would involve validating the card identified by the card number and subsequent cards; but alternative algorithms could be used.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or steps for performing a function. Therefore, it should be understood that such language is entitled to cover all such structures, materials, or acts disclosed within this specification and their equivalents.

It is thought that the apparatuses and methods of the embodiments of the present invention and its attendant advantages will be understood from this specification. While the above is a complete description of specific embodiments of the invention, the above description should not be taken as limiting the scope of the invention as defined by the claims.

What is claimed is:

1. A method of activating a plurality of gift cards at a POS device, said method comprising:
   providing a plurality of plastic gift cards that each have an account identifier stored thereon, wherein the plastic gift cards are coupled together in a packaging arrangement;
   entering an activation indicator from one of the plurality of gift cards into the POS device;
   transmitting the activation indicator from the POS device to an activation computer system to activate all of the gift cards in the packaging arrangement along with a purchase price;
   receiving a confirmation at the POS device that all of the gift cards in the packaging arrangement have been activated.

2. The method as described in claim 1, wherein the packaging arrangement comprises shrink wrap.

3. The method as described in claim 1, wherein the activation indicator is entered by one of: reading a magnetic stripe on the card using a magnetic stripe reader, scanning a bar code on the card, hand keying in the activation indicator in the POS device.

4. The method as described in claim 1, wherein the activation indicator comprises one of the account identifiers.

5. The method as described in claim 4, wherein the account identifiers comprise card numbers.

6. A method of activating a plurality of gift cards at a POS device, said method comprising:
   providing a packaging arrangement comprising plurality of plastic gift cards that each have an account identifier stored thereon, wherein the plastic gift cards are coupled together in the packaging arrangement;
   entering a package identifier from the packaging arrangement into the POS device;
   transmitting the package identifier from the POS device to an activation computer system to activate all of the gift cards in the packaging arrangement along with a purchase price;
   receiving a confirmation at the POS device that all of the gift cards in the packaging arrangement have been activated.

7. The method as described in claim 6, wherein the packaging arrangement comprises shrink wrap.

8. The method as described in claim 6, wherein the package identifier is entered by one of: reading a magnetic stripe on one of the cards using a magnetic stripe reader, scanning a bar code on one of the cards, hand keying in the package identifier in the POS device.

9. The method as described in claim 6, wherein the step of receiving confirmation comprises receiving a batch number from the activation computer system.

10. The method as described in claim 6, wherein the package identifier comprises an account identifier that is stored on one of the cards.

11. The method as described in claim 10, wherein the account identifier comprises a card number.

12. A method of activating of a plurality of gift cards, said method comprising:

receiving at an activation computer system from a POS device an activation indicator from a plastic gift card in a plurality of packaged, plastic gift cards along with a purchase amount;

determining at the activation computer system whether the plurality of packaged gift cards can be activated at the same time based at least in part on the activation indicator;

communicating from the activation computer system to the POS device a validation signal so as to indicate at the POS device whether the plurality of packaged, plastic gift cards can be activated.

13. The method as described in claim 12, and further comprising:

initiating a batch process at the activation computer system to activate each of the plurality of cards.

14. The method as described in claim 12, wherein the activation indicator comprises an account indicator stored on one of the cards.

15. A method of packaging gift cards, said method comprising:

providing a plurality of gift cards having sequential card numbers;

packaging said plurality of gift cards in a common package, wherein the gift cards are packaged such that one of the card numbers is electronically readable in order to activate all of the gift cards in the package at the same time using only the card number.

\* \* \* \* \*